Dec. 30, 1952 G. M. LOE 2,624,042

VARIABLE INDUCTANCE COIL

Filed Dec. 28, 1950

INVENTOR:
GERALD M. LOE
BY Francis W. Crotty
HIS ATTORNEY.

Patented Dec. 30, 1952

2,624,042

UNITED STATES PATENT OFFICE 2,624,042

VARIABLE INDUCTANCE COIL

Gerald M. Loe, Maywood, Ill., assignor to Zenith Radio Corporation, a corporation of Illinois Application December 28, 1950, Serial No. 203,067

6 Claims. (Cl. 336—20)

This invention relates to variable inductors and especially to an inductance coil for use in a high-frequency resonant circuit and having simple means for varying its apparent inductance.

Most present-day television receivers are of the superheterodyne type and require an oscillator for generating a heterodyne signal of relatively high frequency. The resonant circuit of such an oscillator usually comprises an inductance coil formed by a closed loop of conductive material. The conductive material may be a strip, and one extremity of this strip may be bent over so that it is parallel to the other extremity. A dielectric plate may be interposed between the parallel conductor portions to form a capacitor in shunt with the inductance coil. The resonant frequency of the resulting assembly is determined by several factors, one of which is the area enclosed by the loop.

In accordance with the present invention, a flexible conductive strip is disposed preferably within the loop and affixed thereto at its extremities. Means are provided for distorting this flexible strip to alter the area effectively enclosed by the coil and, hence, alter its apparent inductance. In this manner, the resonant frequency of the resonant circuit may be varied for trimming purposes.

It is, accordingly, and object of this invention to provide an improved inductance coil of the variable type that may be constructed in a simple, expedient and economical fashion.

A further object of this invention is to provide an improved inductance coil as a component of a relatively high-frequency resonant circuit, and which includes a simple arrangement for varying the inductance of the coil and, therefore, the resonant frequency of the circuit.

Figure 1:
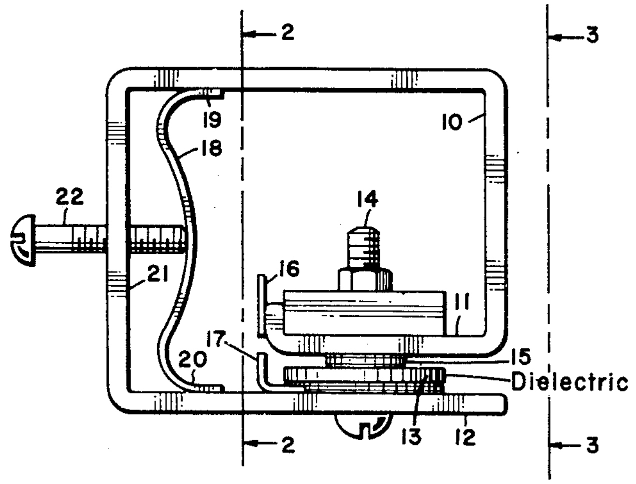
Figure 2:
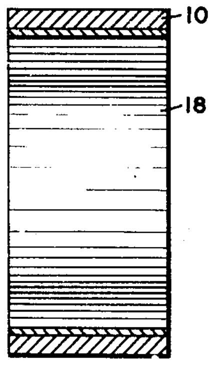
Figure 3:
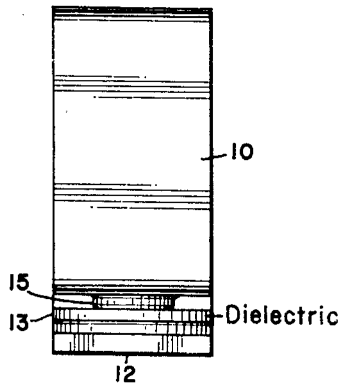

The features of this invention which are believed to be new are set forth with particularity in the appended claims. The invention itself, however, together with further objects and advantages thereof may best be understood by reference to the following description when taken in conjunction with the accompanying drawing, in which:

Figure 1–3 show various views of a resonant circuit including the variable inductance coil of the invention.

The resonant circuit comprises a strip of conductive material 10 formed into a closed loop. One extremity 11 of strip 10 is bent over so that it lies in a plane parallel to but displaced from the other extremity 12. A plate of dielectric material 13 is placed between the conductor sections 11 and 12 which are held against the plate by means of a screw 14. It is preferable that strip 10 be of a resilient nature and extremity 11 be deformed to provide a projection 15. Screw 14 may be adjusted to alter the displacement between the parallel sections and, therefore, vary the capacity of the capacitor formed thereby, projection 15 acting to maintain the sections and the dielectric plate in a rigid assembly for various adjustments of the screw. Connection may be made to the resonant network by means of leads 16, 17 connected respectively to extremities 11 and 12.

A flexible conductive strip 18 is preferably disposed within the loop and affixed thereto at its ends 19, 20 by welding soldering or other suitable means. Strip 18 is, preferably, resilient in nature and tends to conform to the contour of portion 21 of the loop 10 bridged by the strip. An aperture is formed in portion 21 and a screw 22 is threaded through the aperture to coact with the center portion of resilient strip 18. Adjustment of screw 22 distorts the resilient strip, urging it inwardly to alter the area effectively enclosed by the coil and vary the apparent inductance of the coil.

In a constructed embodiment of the invention, loop 10 was composed of silver-plated brass ½″ wide and $\frac{1}{32}$″ thick. Resilient strip 18 was composed of silver-plated brass ½″ wide and .002″ thick. This latter strip was soldered to the inside of strip 10 at its extremities and conformed closely to the contour of the bridged portion 21 of the loop 10 when the pressure of screw 22 was relieved.

This invention provides, therefore, an inductance coil-condenser assembly suitable for use in high-frequency resonant networks, and which includes a simple and expedient means for adjusting its inductive value for trimming purposes.

It is to be understood that the invention is not limited to single loop inductance coils, for resilient strips such as 18 may be secured to one or more of the loops of a multi-loop coil and distorted in unison for inductance variation.

While a particular embodiment of the invention has been shown and described modifications may be made and it is intended in the appended claims to cover all such modifications as fall within the true spirit and scope of the invention.

I claim:

1. A variable inductance coil comprising: at least one loop of conductive material enclosing a predetermined area; a flexible conductive strip disposed within and bridged across one section of said loop with its extremities affixed thereto;

and means for distorting said strip in the plane of said loop to alter the area effectively enclosed by said coil and vary its apparent inductance.

2. A variable inductance coil comprising: a loop of conductive material enclosing a predetermined area; a resilient conductive strip disposed within and bridged across one section of said loop with its extremities affixed thereto and tending to conform to the contour of said section of said loop; and means for distorting said resilient strip inwardly of said loop to alter the area effectively enclosed by said coil and vary its apparent inductance.

3. A variable inductance coil comprising: a loop of conductive material enclosing a predetermined area and having an aperture therein; a flexible conductive strip disposed within and bridged across one section of said loop adjacent said aperture with its extremities affixed to said loop; and means extending through said aperture for distorting said flexible strip in the plane of said loop to alter the area effectively enclosed by said coil and vary its apparent inductance.

4. A variable inductance coil comprising: a loop of conductive material enclosing a predetermined area and having an aperture therein; a flexible conductive strip disposed within and bridged across one section of said loop adjacent said aperture with its extremities affixed to said loop; and a screw threaded through said aperture for distorting said flexible strip in the plane of said loop to alter the area effectively enclosed by said coil and vary its apparent inductance.

5. A variable inductance coil normally enclosing a predetermined area comprising: a looped strip of conductive material having an aperture therein; a resilient conductive strip disposed within said coil adjacent said aperture with its extremities affixed to the internal surface of said first-mentioned strip, and tending to conform to the contour of a section of said internal surface; and a screw threaded through said aperture for urging the center portion of said resilient strip inwardly in the plane of said looped strip to alter the area effectively enclosed by said coil and vary its apparent inductance.

6. A variable inductance coil comprising: a loop of conductive material enclosing a predetermined area; a flexible conductive strip bridged across one section of said loop with its extremities affixed thereto; and means for distorting said strip to alter the area effectively enclosed by said coil and vary its apparent inductance.

GERALD M. LOE.

REFERENCES CITED

The following references are of record in the file of this patent:

UNITED STATES PATENTS

| Number | Name | Date |
|---|---|---|
| 2,367,576 | Harvey | Jan. 16, 1945 |
| 2,410,222 | Lawrence | Oct. 29, 1946 |

FOREIGN PATENTS

| Number | Country | Date |
|---|---|---|
| 234,570 | Great Britain | June 4, 1925 |